(12) United States Patent
Romano et al.

(10) Patent No.: US 11,529,014 B2
(45) Date of Patent: Dec. 20, 2022

(54) DISPENSING ASSEMBLY FOR COLD BEVERAGES

(71) Applicant: ILLYCAFFE' S.P.A., Trieste (IT)

(72) Inventors: Mark Romano, Trieste (IT); Paola Muggia, Trieste (IT); Maurizio Gasparin, Trieste (IT); Claudio Bolzicco, Trieste (IT)

(73) Assignee: ILLYCAFFÉ S.P.A., Trieste (IT)

( * ) Notice: Subject to any disclaimer, the term of this patent is extended or adjusted under 35 U.S.C. 154(b) by 640 days.

(21) Appl. No.: 16/500,165

(22) PCT Filed: Mar. 15, 2018

(86) PCT No.: PCT/IB2018/051732
§ 371 (c)(1),
(2) Date: Oct. 2, 2019

(87) PCT Pub. No.: WO2018/185581
PCT Pub. Date: Oct. 11, 2018

(65) Prior Publication Data
US 2021/0022545 A1    Jan. 28, 2021

(30) Foreign Application Priority Data

Apr. 4, 2017 (IT) .......................... 102017000037089

(51) Int. Cl.
*B01F 3/04* (2006.01)
*A47J 31/44* (2006.01)
(Continued)

(52) U.S. Cl.
CPC ......... *A47J 31/4485* (2013.01); *B01F 23/232* (2022.01); *B01F 23/235* (2022.01);
(Continued)

(58) Field of Classification Search
CPC .......... A47J 31/4485; B01F 23/237611; B01F 25/312; B01F 23/232; B01F 23/235;
(Continued)

(56) References Cited

U.S. PATENT DOCUMENTS 3,221,936 A    12/1965  Spinuzza
3,718,233 A     2/1973  Nordhoff
(Continued)

FOREIGN PATENT DOCUMENTS

DE    202012009076 U1   11/2012
EP         2583596 A1    4/2013
(Continued)

OTHER PUBLICATIONS

European Patent Office, International Search Report, issued in PCT/IB2018/051732, dated Jun. 19, 2018, Rijswijk, Netherlands.

*Primary Examiner* — Charles S Bushey
(74) *Attorney, Agent, or Firm* — ArentFox Schiff LLP; Michael Fainberg

(57) ABSTRACT

A dispensing assembly for cold beverages includes a beverage supply conduit, an opening and closing tap for closing or opening the beverage supply conduit, a beverage dispensing conduit delimiting a fluid passage, a dispensing outlet arranged at the end of the dispensing conduit, an air supply conduit delimiting an air passage. The tap is directly connected to the dispensing outlet by providing a connecting coupling which connects the air supply conduit to the beverage dispensing conduit, the beverage dispensing conduit comprising a Venturi segment between the tap and the outlet in which, by flowing through the Venturi segment, the fluid passage reduces the cross section thereof and then increases the cross section thereof as in a Venturi conduit. An air passage regulating valve is provided in said air supply conduit for regulating the width of the air passage.

8 Claims, 15 Drawing Sheets

(51) Int. Cl.
  *B01F 23/232* (2022.01)
  *B01F 23/235* (2022.01)
  *B01F 25/312* (2022.01)
  *B01F 35/92* (2022.01)
  *B01F 35/71* (2022.01)
  *B01F 23/237* (2022.01)
  *B01F 35/90* (2022.01)
  *B01F 101/14* (2022.01)

(52) U.S. Cl.
  CPC .... *B01F 25/312* (2022.01); *B01F 35/718051* (2022.01); *B01F 35/92* (2022.01); *B01F 23/237611* (2022.01); *B01F 2035/98* (2022.01); *B01F 2101/14* (2022.01)

(58) Field of Classification Search
  CPC .............. B01F 35/718051; B01F 35/92; B01F 2035/98; B01F 2101/14
  USPC ............ 261/127, 130, 76, 77; 426/474, 477
  See application file for complete search history.

(56) References Cited

U.S. PATENT DOCUMENTS

| | | | |
|---|---|---|---|
| 4,028,441 A * | 6/1977 | Richards | G05D 7/0193 62/307 |
| 4,226,343 A | 10/1980 | Fling | |
| 5,022,557 A | 6/1991 | Turner | |
| 5,044,528 A | 9/1991 | Becker | |
| 5,265,520 A | 11/1993 | Giuliano | |
| 5,363,989 A | 11/1994 | Zeamer et al. | |
| 5,431,302 A | 7/1995 | Tulley et al. | |
| 5,730,323 A | 3/1998 | Osborne | |
| 5,738,002 A | 4/1998 | Marano-Ducarne | |
| 8,367,133 B2 * | 2/2013 | Keller | B01F 25/312 99/452 |
| 9,207,222 B2 | 12/2015 | Tata | |
| 9,381,473 B2 | 7/2016 | Bönsch et al. | |
| 9,955,710 B2 * | 5/2018 | Hyde | B01F 23/236 |
| 10,730,023 B2 * | 8/2020 | Hyde | B01F 23/236 |
| 2007/0128326 A1 | 6/2007 | Milo et al. | |
| 2007/0194264 A1 | 8/2007 | Arov et al. | |
| 2008/0148955 A1 | 6/2008 | Neace et al. | |
| 2010/0199851 A1 * | 8/2010 | Fuenten | A47J 31/4485 99/302 R |
| 2010/0278995 A1 | 11/2010 | Boehm et al. | |
| 2011/0180565 A1 | 7/2011 | Racino et al. | |
| 2011/0311694 A1 * | 12/2011 | Broennimann | A47J 31/4485 99/453 |
| 2015/0007900 A1 * | 1/2015 | Li | F23D 14/04 137/892 |
| 2016/0007626 A1 | 1/2016 | Choi et al. | |
| 2016/0051083 A1 * | 2/2016 | Turi | B01F 23/2362 99/290 |
| 2016/0262417 A1 | 9/2016 | Choi et al. | |

FOREIGN PATENT DOCUMENTS

| | | |
|---|---|---|
| EP | 2798988 A1 | 11/2014 |
| EP | 2987435 A1 | 2/2016 |
| WO | 2015015275 A1 | 2/2015 |
| WO | 2016183702 A1 | 11/2016 |

* cited by examiner

DISPENSING ASSEMBLY FOR COLD BEVERAGES

CROSS-REFERENCE TO RELATED APPLICATIONS

This application is a National Phase Application of PCT International Application No. PCT/IB2018/051732, having an International Filing Date of Mar. 15, 2018 which claims priority to Italian Application No. 102017000037089 filed Apr. 4, 2017, each of which is hereby incorporated by reference in its entirety.

FIELD OF THE INVENTION

The present invention relates to a dispensing assembly of a cold beverage.

In particular, the present invention relates to a dispensing assembly for coffee and to a dispensing method.

BACKGROUND ART

The possibility of extracting coffee infusion and dispensing it cold has been known for some time.

For example, it is known to dispense cold coffee using a faucet device similar to the one used for dispensing beer.

These known devices have a pressurized tank connected to a dispensing faucet. In particular, dispensing devices with tap and manually controllable controls are known, as described in document US2007194264 of Arov et al., or dispensing devices with tap and electric or electronic controls are known, as described in documents U.S. Pat. No. 3,221,936 of Spinuzza and U.S. Pat. No. 5,730,323 of Codell Industries Inc. Other solutions are known from U.S. Pat. Nos. 3,718,233, 4,226,343, 5,022,557, 5,044,528, 5,363,989, 5,431,302, WO2015015275, US2011180565.

However, it is known that these cold beverages are enjoyed more when they have a foam.

For example, a method for making cold coffee is known from document US2016262417-A1 of PARIS CROISSANT CO LTD. In this known method, gaseous nitrogen is injected into the cold coffee after the coffee has been extracted from the coffee beans. The cold coffee beverage in which the gaseous nitrogen is dissolved is cooled, thus forming nitrogenous cold coffee showing a foam.

Similar solutions are known from US2007128326-A1 of NESTEC SA, US2008148955-A1 of BEAN LOGIK LLC, US2010278995-A1 of NESTEC SA, U.S. Pat. No. 9,207,222B2 of Murthy Tata and US2016007626-A1 of PARIS CROISSANT CO LTD.

Although they are advantageous under various viewpoints, these known solutions are complex to make and also complex to use and service, since they provide for the supplying of pressurized nitrogen and the replacement of the empty nitrogen cylinders, and also the construction and maintenance of a complex nitrogen system supplying the dispensing assembly of the cold coffee.

These and other drawbacks limit the use of these devices.

The use of nitrogen in these devices is preferred for its little dissolvability in the liquids and therefore the ability thereof to form an increased volume of foam.

However, the injection of nitrogen into beverages is not always welcome. Indeed, precisely due to the poor ability thereof to dissolve in liquids, it is not welcome by all when ingested in conjunction with the beverage.

In completely different devices—machines for making hot coffee and cappuccino—it is known to make the milk foam by emulsifying the milk by means of water vapor.

Document WO2016183702 of NINGBO QUANJING ELECTRIC TECH CO LTD shows a recent solution of this type of devices.

There are also known devices for frothing the milk which use pressurized air injected downstream of a pump. A solution of this type is known from U.S. Pat. No. 9,381,473B2 of WMF WURTTEMBERGISCHE METALLWARENFABRIK AKTIENGESELLSCHAFT.

However, these known solutions are suitable for hot beverages and when they are also suitable for cold beverages, they are complex to construct and make, thus in any case leading to results which are not always suitable to the needs in terms of quality. In particular, the presence of devices for intercepting and/or injecting the frothed beverage of other fluid alters the features of the foam in an undesired manner.

Solutions are also known which are suitable for creating a foam in beverages by means of injecting compressed air. Although these known solutions are advantageous from certain viewpoints, they are in any case complex to construct, noisy to use and require particular maintenance of the air pressurizing devices or replacement of tanks or cylinders containing pressurized air.

A solution is known from EP2987435 to FRANKE KAFFEEMASCHINEN AG which connects air supply conduit in the beverage supply conduit and upstream of the pump, and then injects other fluids into the beverage supply conduit, and also upstream of a tap and quite far from the outlet or dispensing mouth of the beverage.

From documents U.S. Pat. No. 5,265,520 to NUOVA FAEMA SPA and U.S. Pat. No. 5,738,002 to MARANO-DUCARNE, ANTHONY, it is known to obtain frothed milk by injecting air into a coffee supply conduit downstream of a pump.

However, although these known solutions are suitable for hot beverages and in particular for frothing milk to be mixed with coffee extract, they allow a non-homogeneous and non-compact foam to be obtained in the beverage dispensed since here it is not of interest to uniformly mix foam throughout the contents of the beverage, rather only to obtain frothed milk to be mixed in the non-frothed or flat coffee. Similar solutions are known from EP2798988 to MELITTA SYSTEMSERVICE GMBH & CO KOMMANDITGESELLSCHAFT and EP2583596 to FRANKE KAFFEEMASCHINEN AG and DE202012009076 to EUGSTER FRISMAG AG. Therefore, the need is strongly felt to propose a device for dispensing a cold beverage which allows a foam to be formed in a simple, safe and quality manner, in particular being distributed throughout the beverage in as uniform a manner as possible.

Moreover, the need is felt to simplify the production of a cold coffee dispensing device which allows to modulate the formation of the foam, thus easily dispensing a beverage both with foam and without foam.

Furthermore, the need is felt to provide a cold coffee dispensing device which allows to reduce the operating noise typically present in compressed gas plants.

SUMMARY OF THE INVENTION

It is thus the object of the present invention to devise a dispensing assembly of a cold beverage and a related dispensing method capable of meeting the needs mentioned above and of solving the problems of the background art.

These and other objects are achieved by a dispensing assembly and a method for dispensing cold beverages as described and claimed herein. Certain advantageous embodiments are also described.

Due to the solutions proposed and described below, the production of the dispensing assembly of a cold beverage, preferably cold coffee, may be simplified by regulating the formation of the foam thereof.

Moreover, thanks to the solutions proposed and described below, the quality of the foam generated may be improved and the regulation of the entity of the foam generated may be simplified.

In particular, due to the solutions proposed, the strong need is solved to avoid altering the foam generated in the beverage, and not only in one of its components but throughout the beverage, with devices such as fluid pressurizing or thrust pumps and with the injection of other fluids, thus avoiding the "unfrothing" or "ruining" of the foam generated throughout the beverage and to the greatest extent possible, maintaining the uniformity and compactness of the foam to obtain a very dense, compact and long-lasting foam.

Moreover, due to the solutions proposed and described below, the use of pumps for injecting gas or pressurized air into the dispensing system may be avoided, thus further simplifying making, using and servicing the assembly.

Moreover, due to the solutions suggested and described below, the noise generated when dispensing the beverage may be significantly reduced.

Moreover, due to the solutions proposed and described below, the quality of the foam generated may be improved and the regulating of the entity of the foam generated may be simplified.

Moreover, due to the solutions proposed and described below, there may be one dispensing assembly alone for cold beverage, preferably coffee, by dispensing it with both the foam and without the foam.

Moreover, due to the solutions proposed and described below, the use of gases such as nitrogen or carbon dioxide or air pressurized by means of specific devices or from pressurized tanks may be avoided.

DRAWINGS

Further features and advantages of the device according to the invention will appear in the description below of its preferred, non-limiting example embodiments, with reference to the accompanying drawings, in which:

FIG. 1 depicts an axonometric view of a dispensing assembly of a cold beverage;

FIG. 2 diagrammatically shows a dispensing assembly according to a first embodiment in which there are noted, again diagrammatically, the main components of the assembly;

Figure 11:
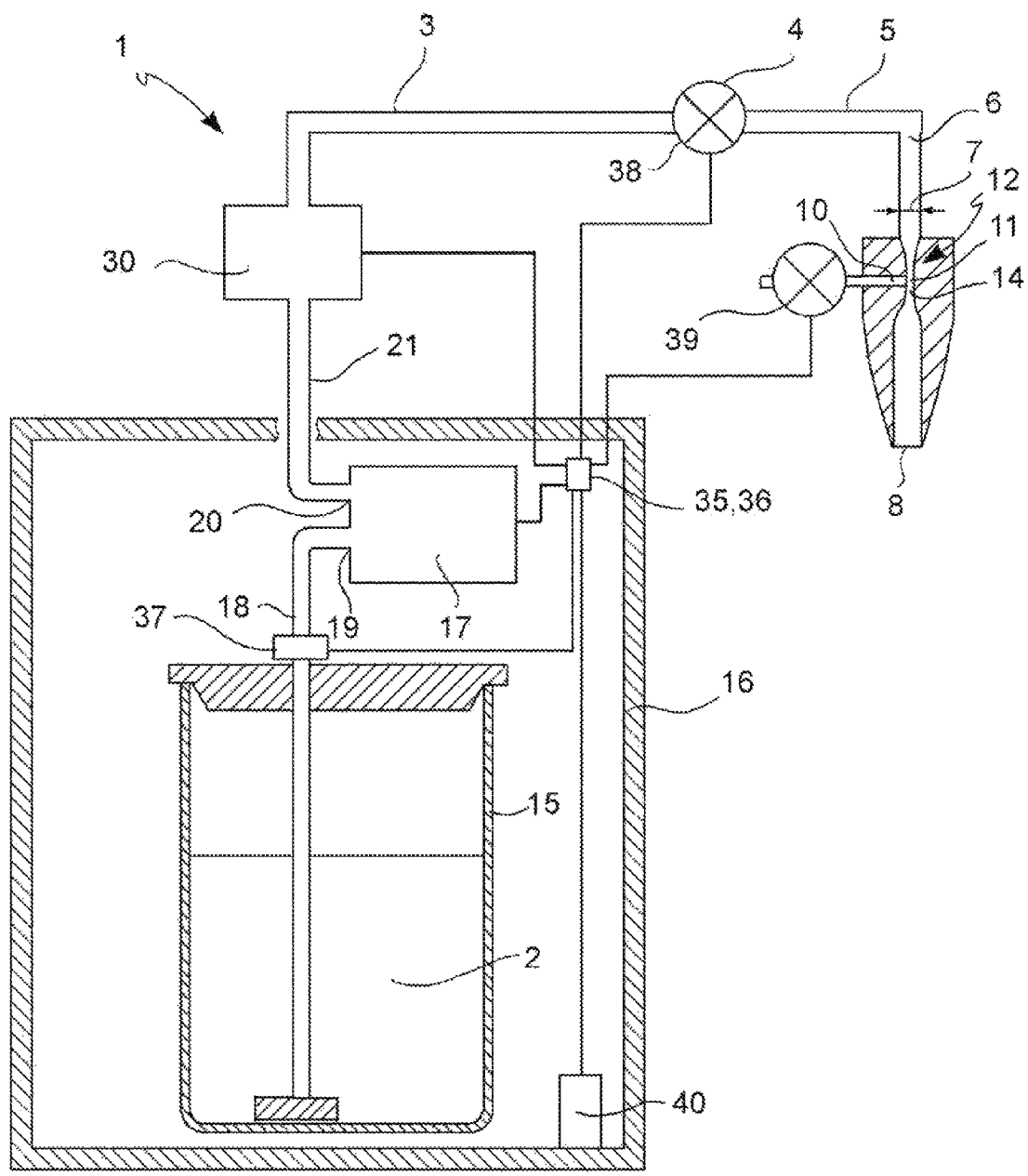
Figure 12:
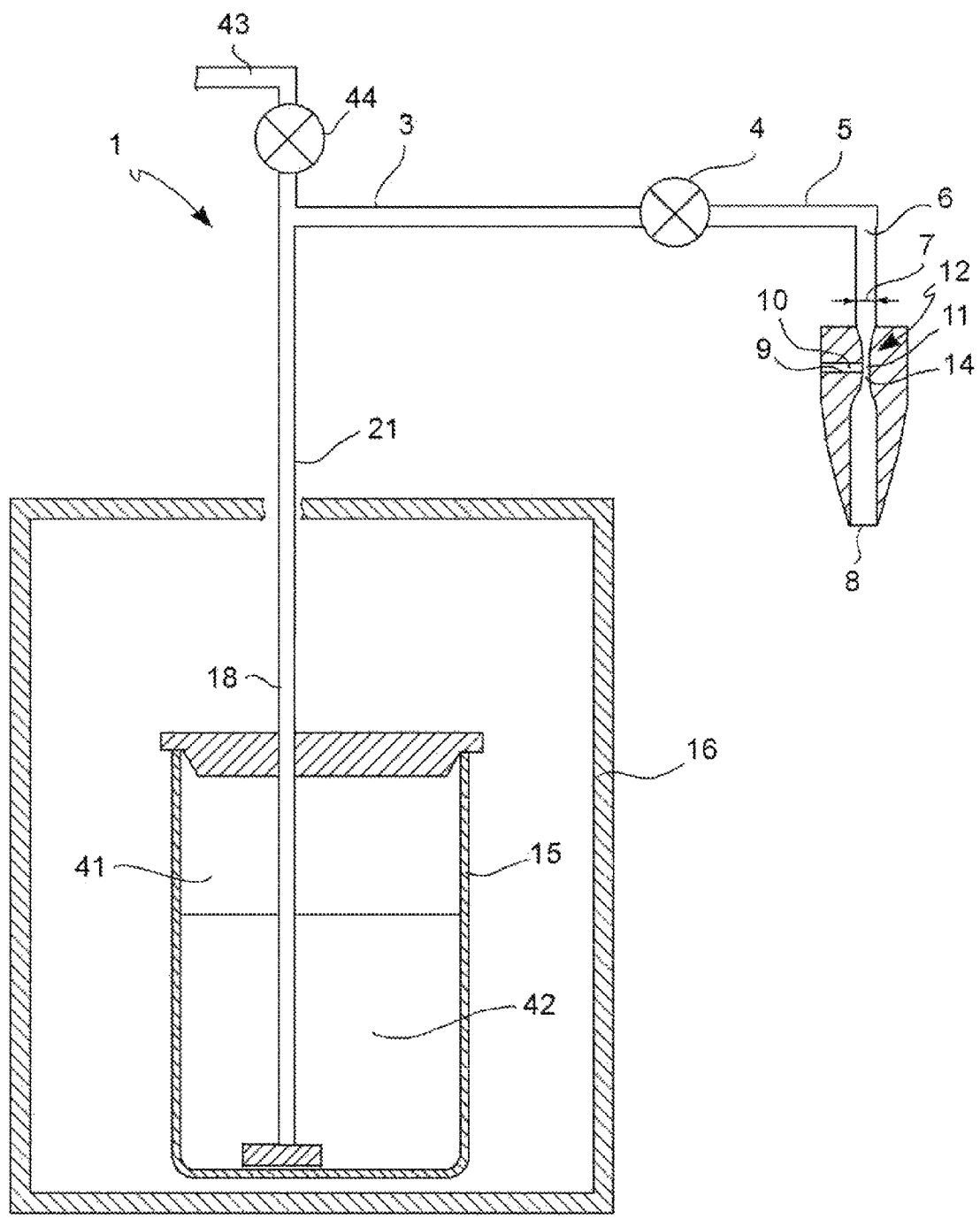
Figure 13:
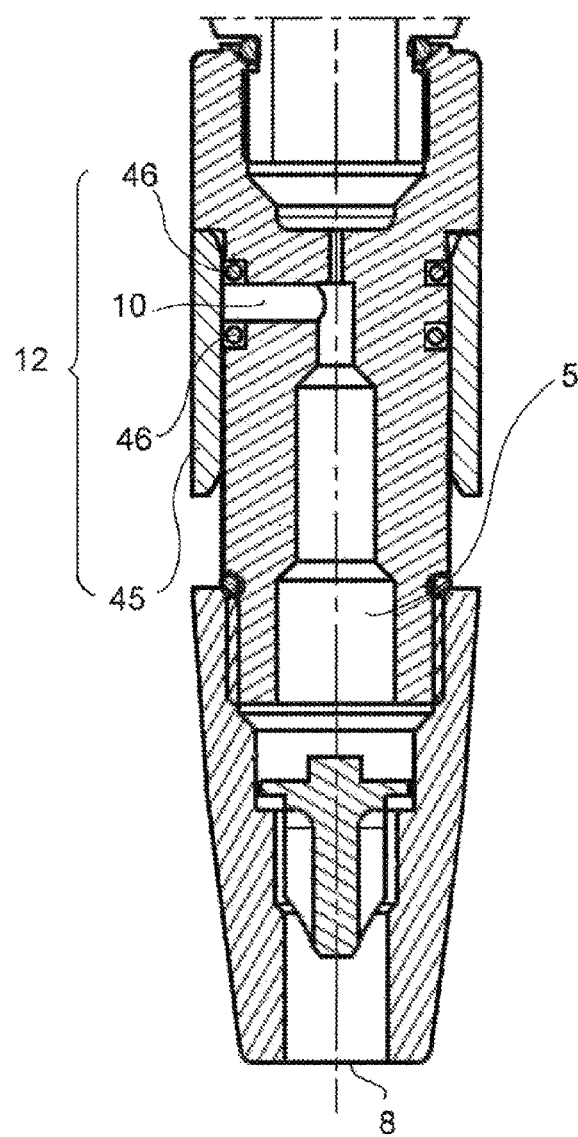
Figure 14:
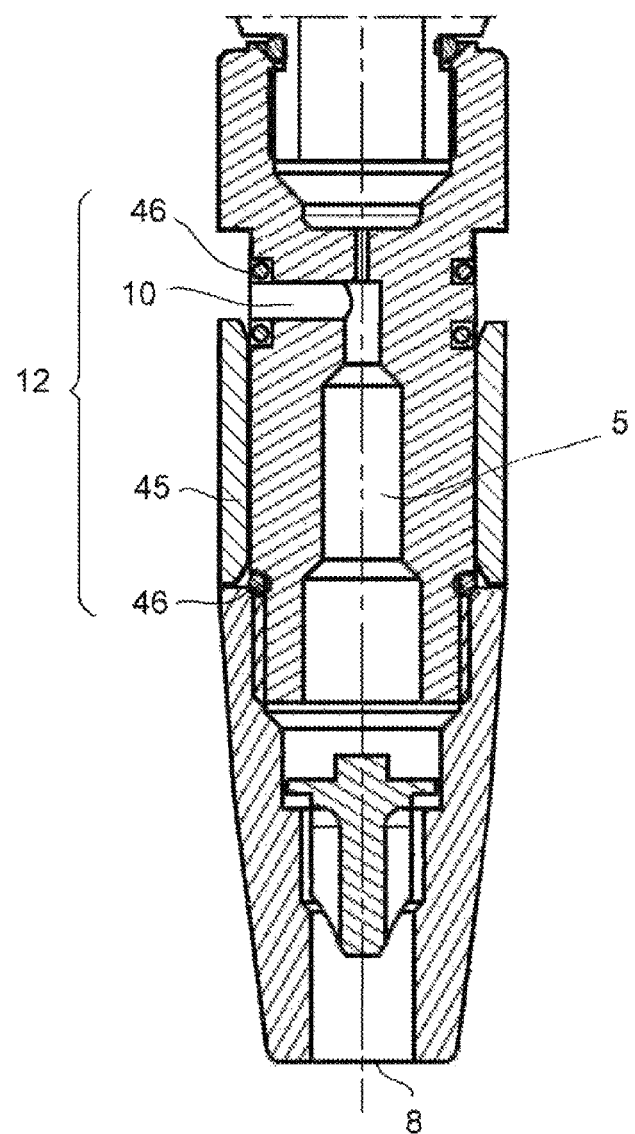

FIG. 11 diagrammatically depicts a dispensing assembly according to various embodiments, in which the main components of the assembly are highlighted, again diagrammatically, which components are combined electrically- or electronically-controlled components;

FIG. 12 diagrammatically depicts a dispensing assembly according to still further embodiments in which the tank is of the pressurized type and, according to a different embodiment, it contains concentrated coffee, and in which the beverage supply conduit provides a fluid coupling for diluting the concentrated coffee;

FIG. 13 shows a longitudinal section of a dispensing conduit according to a further embodiment of the air supply conduit and of the closing device of said conduit which, in this drawing, is in closed position;

FIG. 14 depicts the longitudinal section in FIG. 13 in which the closing device of the air supply conduit is in open position.

Figure 15:
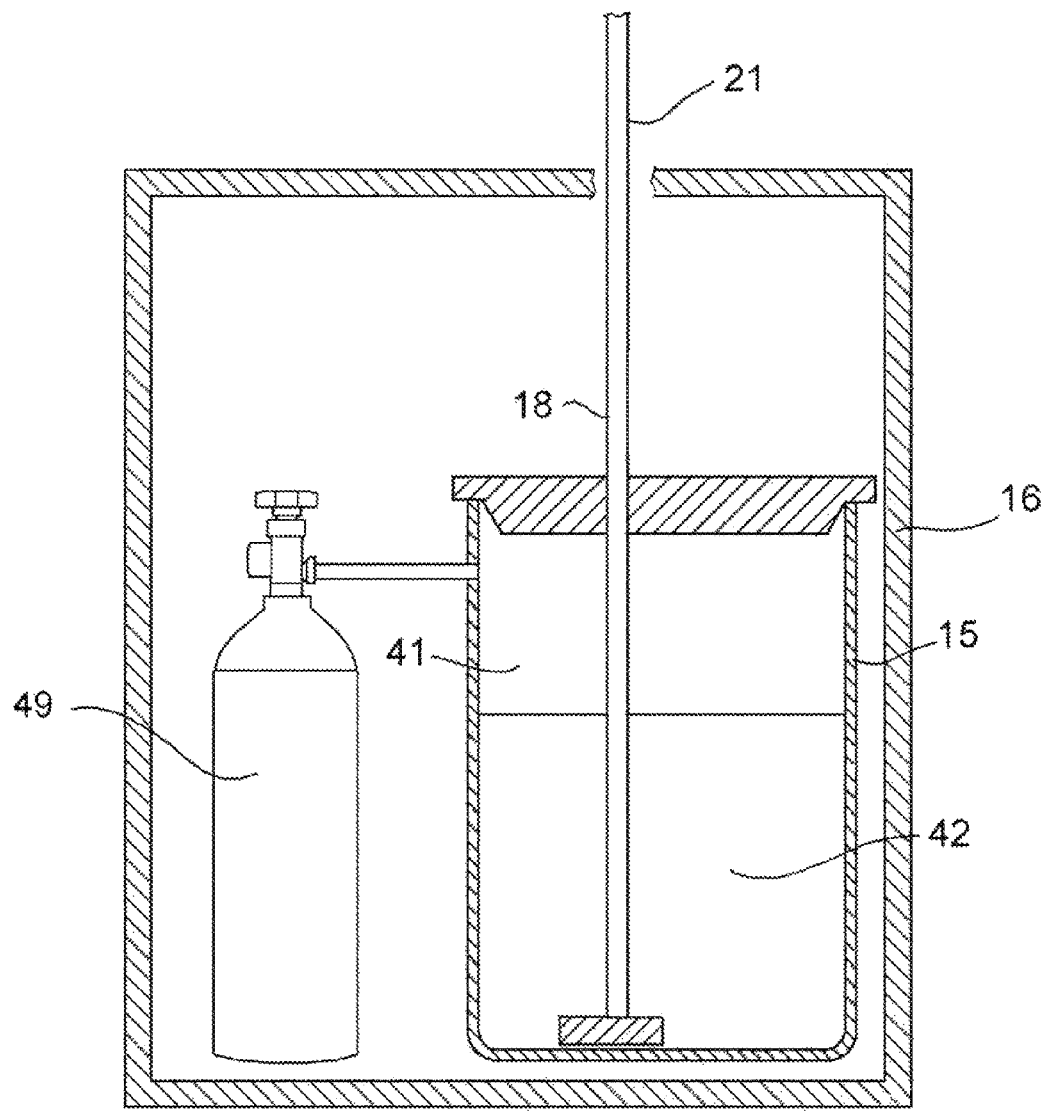
Figure 16:
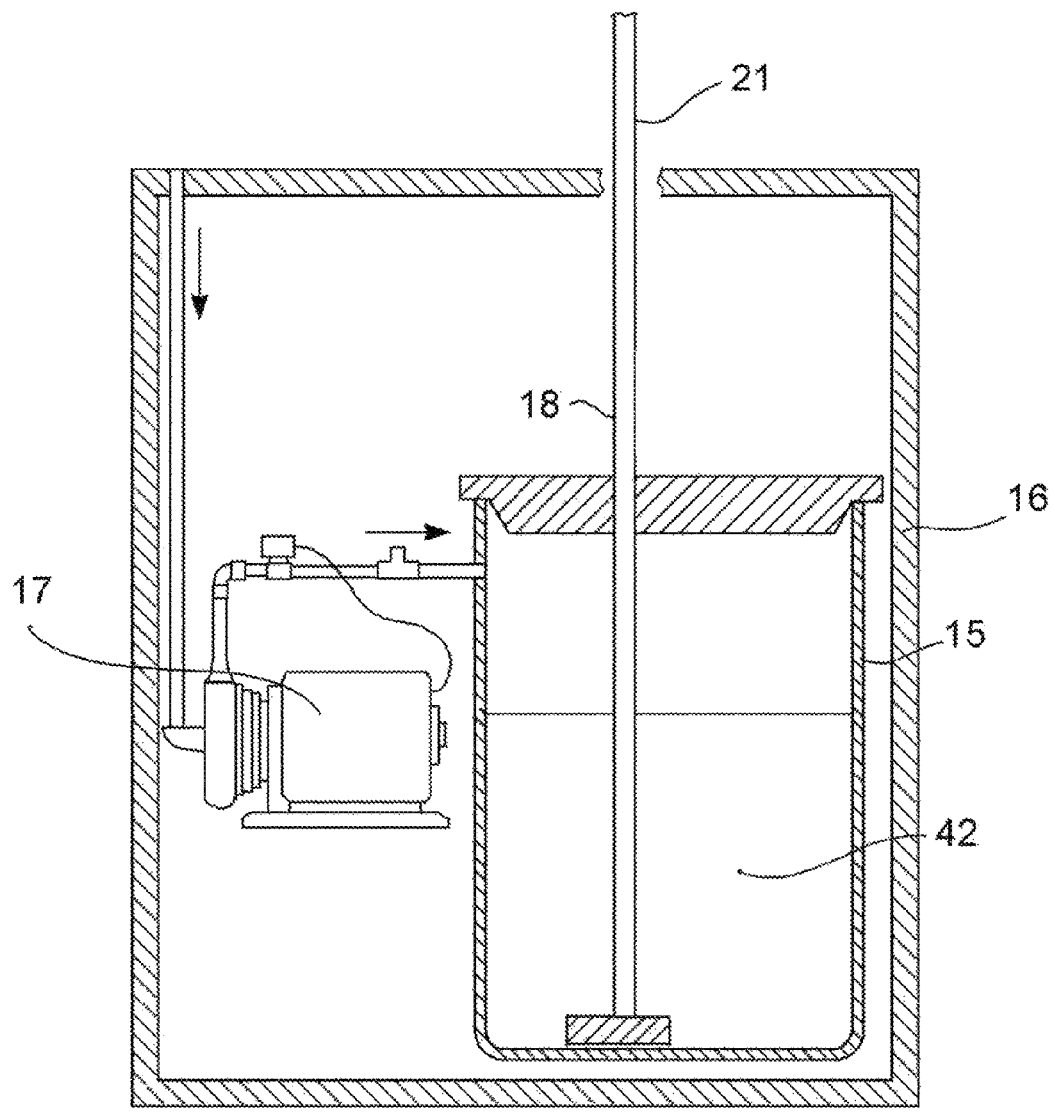
Figure 17:
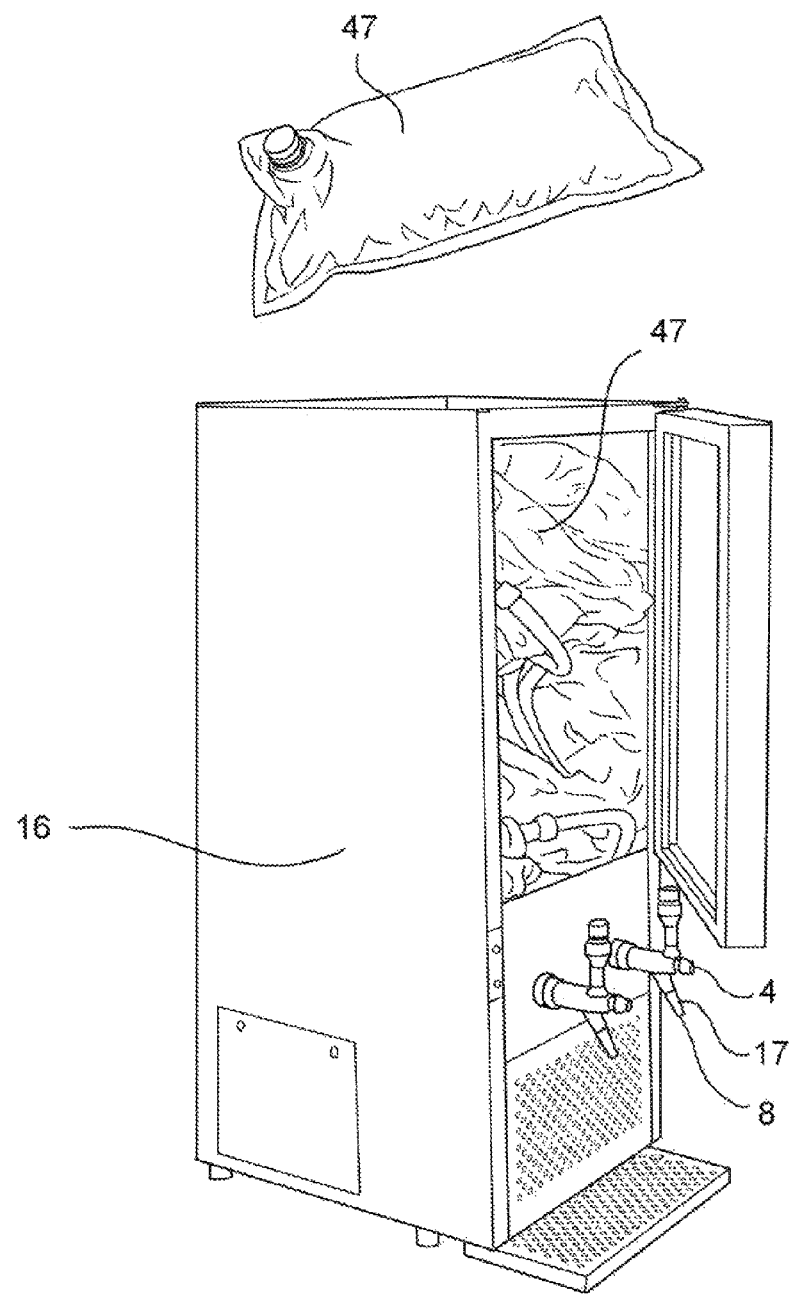
Figure 18:
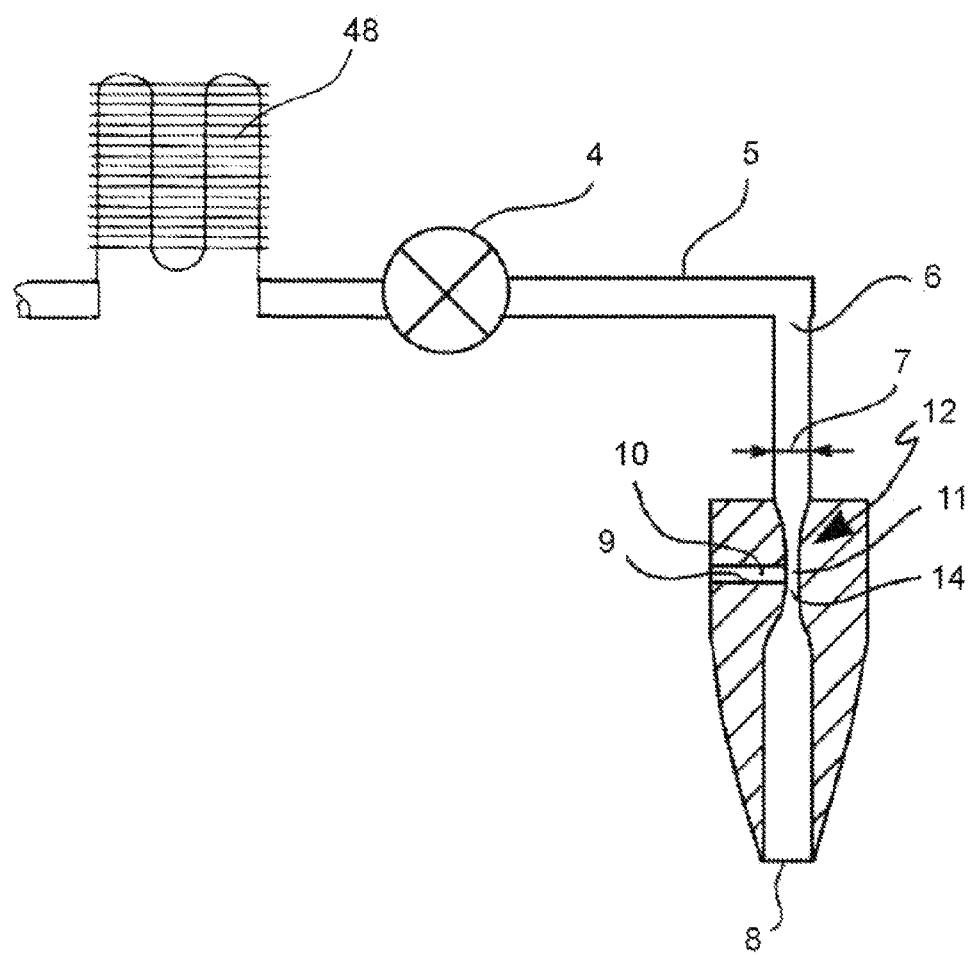

FIG. 15 diagrammatically shows a sectional view of a further embodiment of the fluid energizing device;

FIG. 16 diagrammatically shows a sectional view of a further embodiment of the fluid energizing device;

FIG. 17 diagrammatically shows a sectional view of a further embodiment of a refrigerating device, here of the instantaneous type and downstream of the tank containing the fluid to be dispensed;

FIG. 18 diagrammatically shows a sectional view of a different embodiment of the container for storing the fluid to be dispensed, here in the form of a bag-in box.

DESCRIPTION OF SOME PREFERRED EMBODIMENTS

The elements or parts of elements common to the embodiments described below will be indicated using the same numeral.

With reference to the figures, a dispensing assembly 1 of a beverage 2, for example but not necessarily a cold beverage such as cold coffee, comprises at least one beverage supply conduit 3.

Said assembly 1 further comprises an opening and closing tap 4 for closing or opening the beverage supply conduit 3.

According to one embodiment, said tap is a faucet of the type usually used for dispensing beer.

According to one embodiment, said assembly 1 further comprises at least one beverage dispensing conduit 5.

Said beverage dispensing conduit 5 delimiting a fluid passage 6.

Said fluid passage 6 has a cross section of fluid passage 7 assessed transversely to the longitudinal extension thereof. Said longitudinal extension could also have a curvilinear orientation in addition to a rectilinear orientation.

Figure 1:
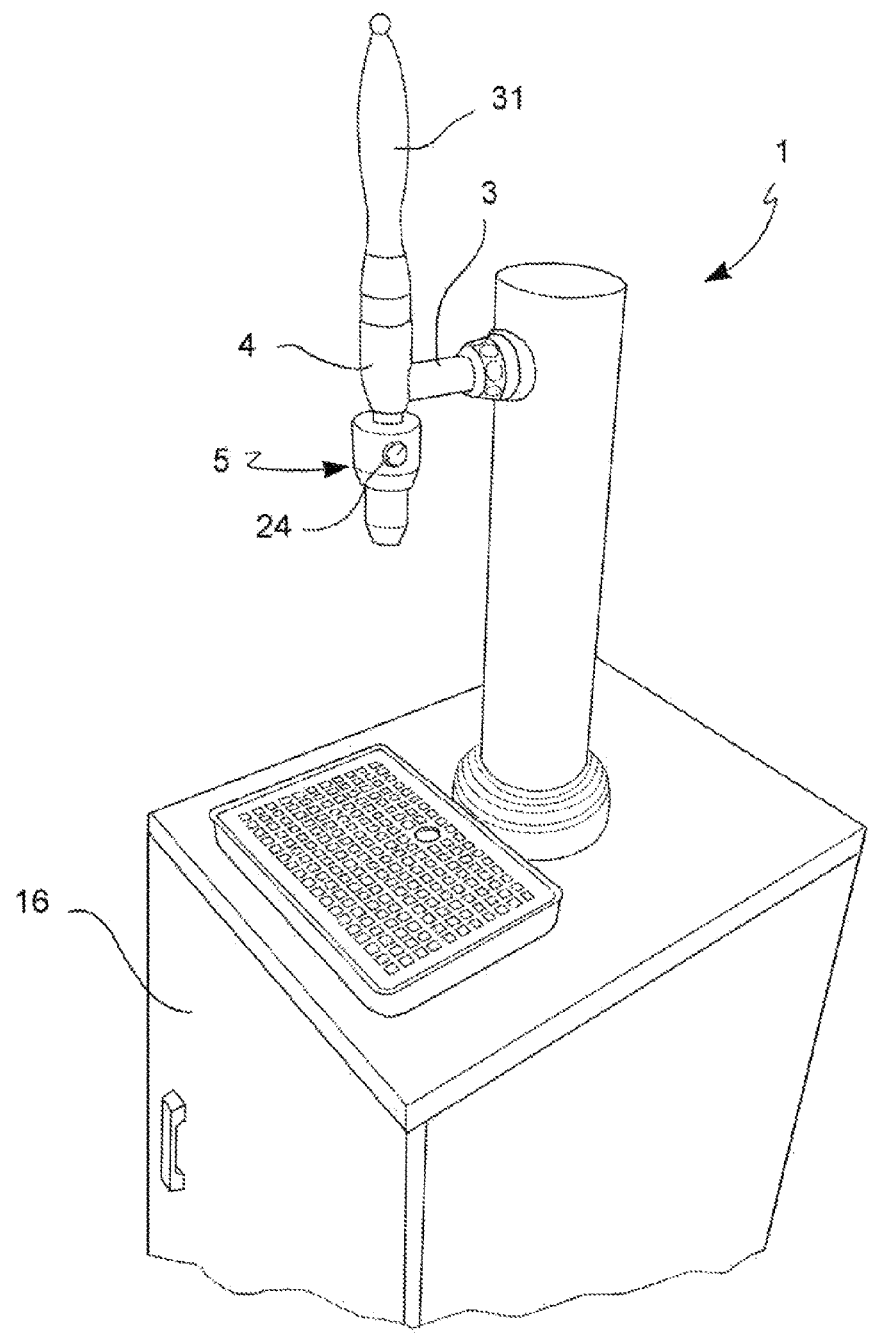
Figure 2:
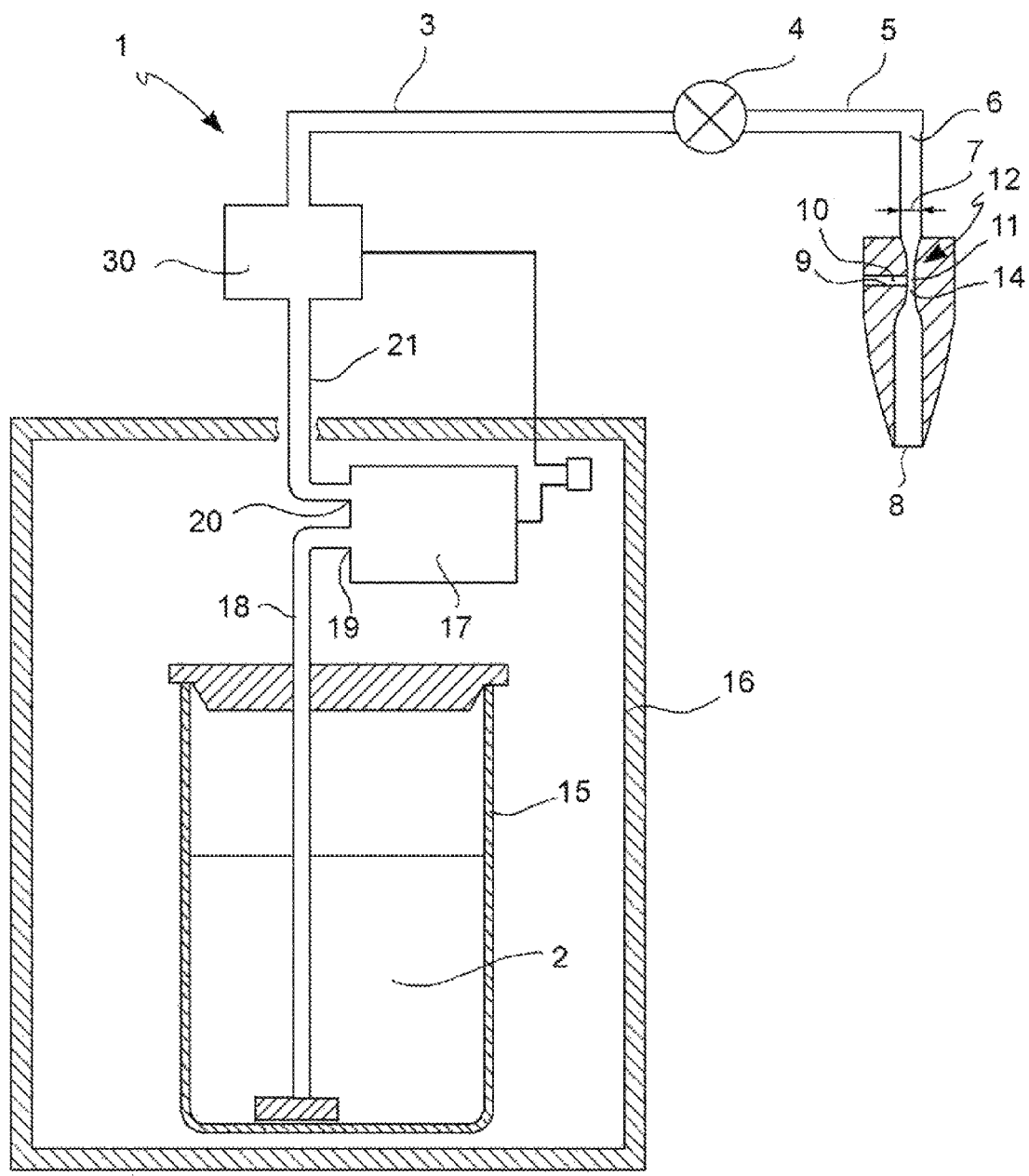
Figure 3:
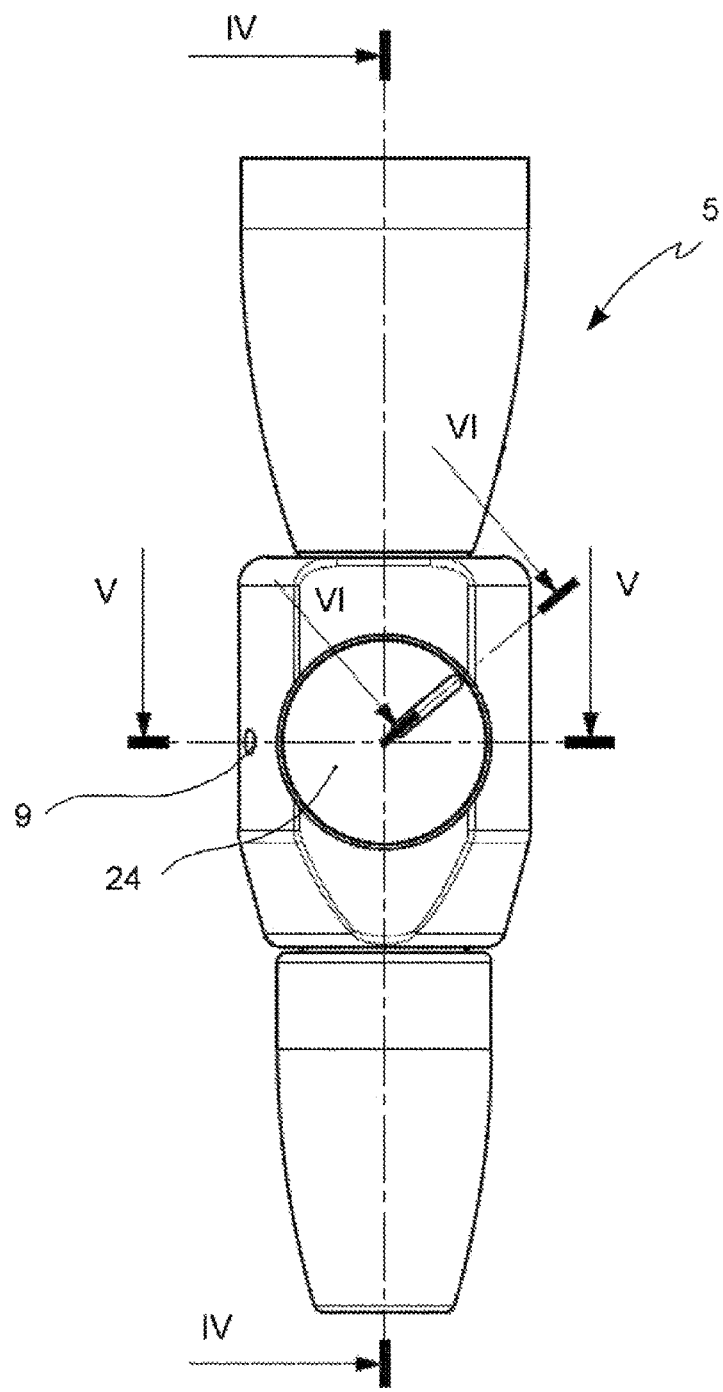
FIG. 3 shows a view of an embodiment of a beverage dispensing conduit.
Figure 4:
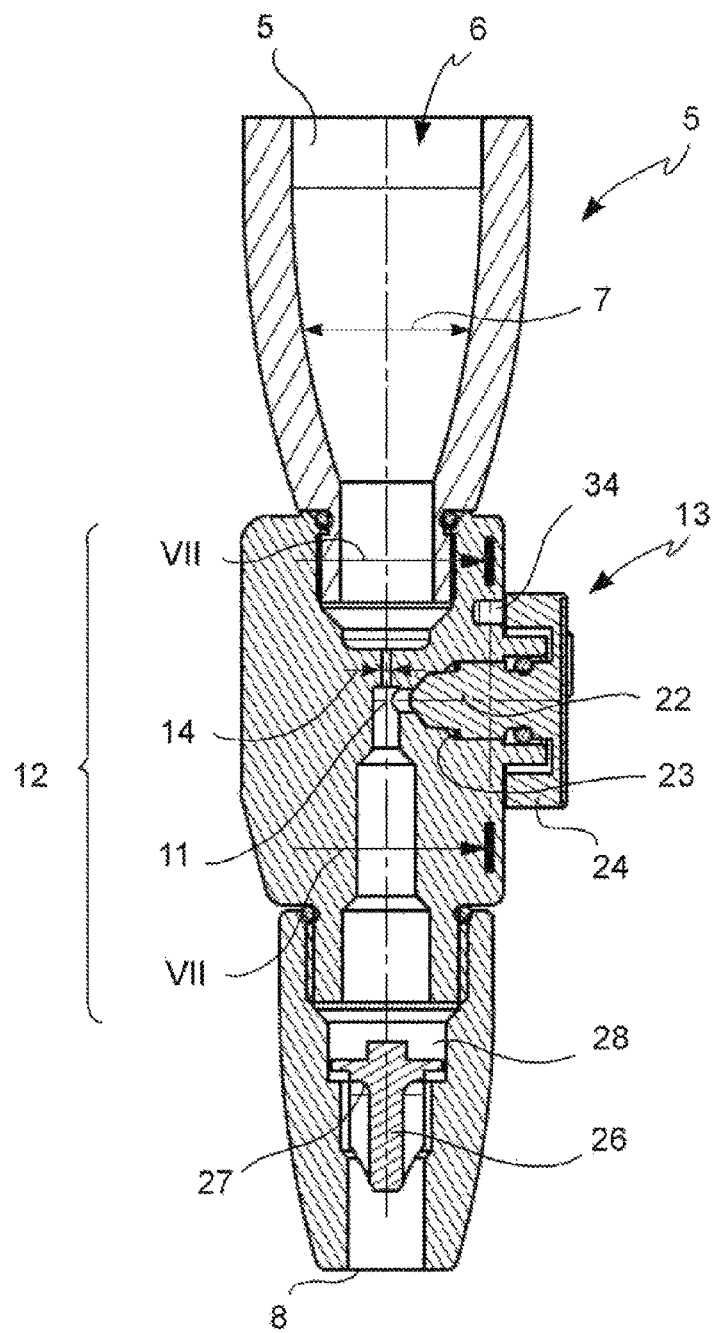
FIG. 4 shows a section along the plane IV-IV in FIG. 3, of the dispensing conduit in FIG. 3.
Figure 5:
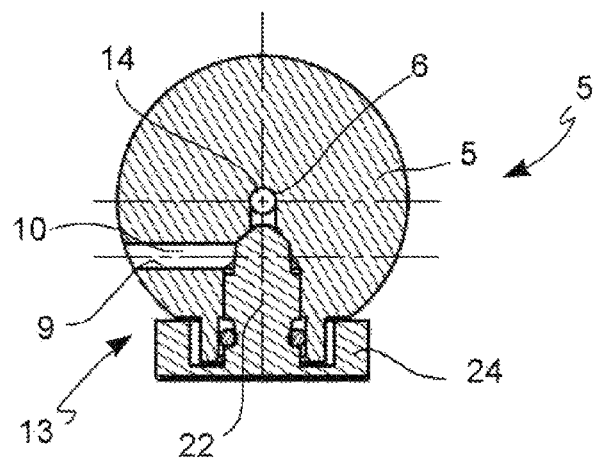
FIG. 5 shows a section along the plane V-V in FIG. 3, of the dispensing conduit in FIG. 3.
Figure 6:
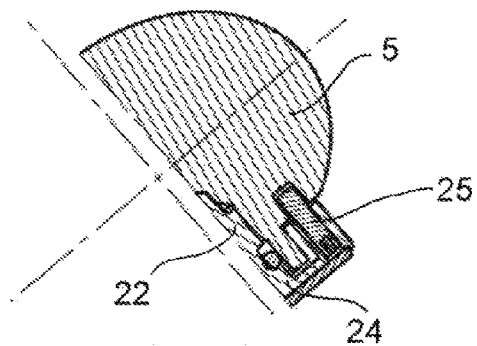
FIG. 6 shows a section along the plane VI-VI in FIG. 3, of the dispensing conduit in FIG. 3.
Figure 7:
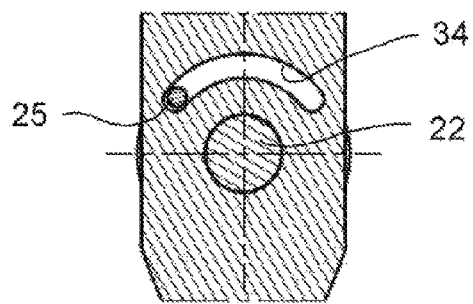
FIG. 7 shows a section along the plane VII-VII in FIG. 3, of a detail of the dispensing conduit in FIG. 3.
Figure 8:
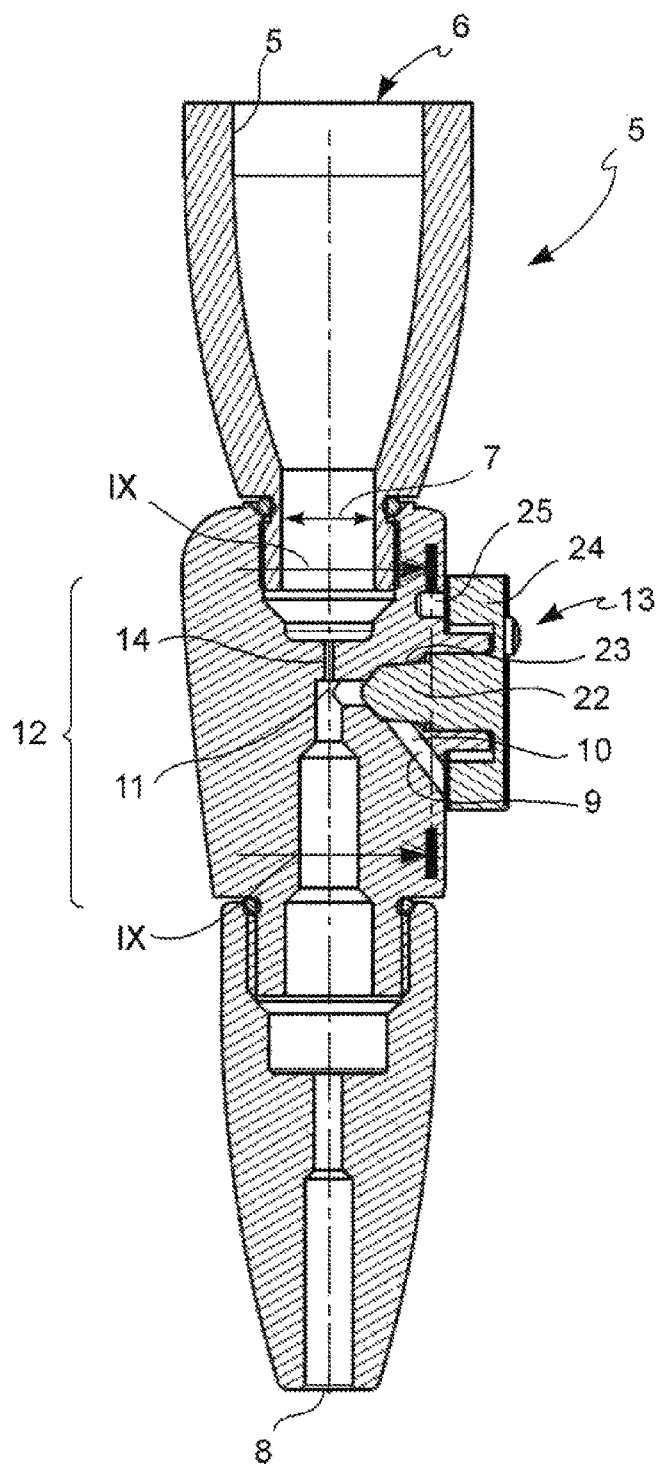
FIG. 8 shows a longitudinal section of a dispensing conduit according to a further embodiment.
Figure 9:
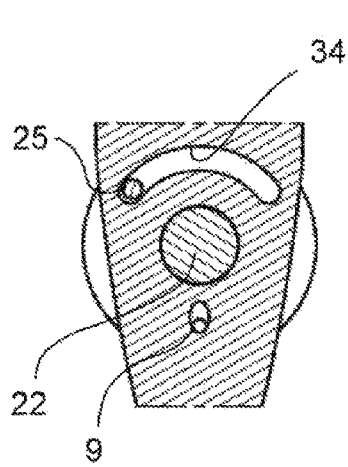
FIG. 9 shows a section along the plane IX-IX in FIG. 8, of a detail of the dispensing conduit in FIG. 8.
Figure 10:
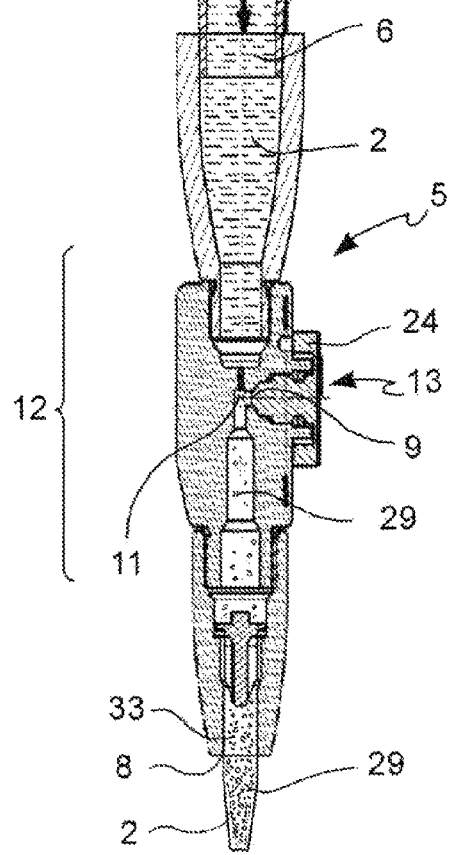
FIG. 10 shows, according to a further embodiment of the dispensing assembly of the beverage, a portion of the beverage supply conduit which converges into a tap connected to a beverage dispensing conduit similar to the one depicted in FIG. 4.

When open, said tap 4 fluidly connects said beverage supply conduit 3 with said beverage dispensing conduit 5, for example as depicted in FIG. 10.

According to one embodiment, said assembly 1 comprises a dispensing outlet opening 8, or, in short, a dispensing outlet.

Said dispensing outlet 8 is arranged at the end of said dispensing conduit 5.

Advantageously, said assembly 1 comprises an air supply conduit 9.

Said air supply conduit 9 delimits an air passage 10.

Moreover, said air supply conduit 9 leads, on a first side thereof, directly outside the dispensing assembly 1, thus putting into communication said air passage with the ambient external to said assembly 1. Moreover, said air supply conduit 9 leads, on the side opposite to said first side, into said beverage dispensing conduit 5, thus forming a connecting coupling 11.

According to one embodiment, said air supply conduit 9 leads, on a first side thereof, directly outside the dispensing assembly 1, thus putting into communication said air passage with the ambient external to said assembly 1, thus avoiding the interposition of return devices or air supply pumps or other means for pressurizing the air, thus leaving the flow of air inlet into said air passage with natural motion.

According to one embodiment, said tap 4 is directly connected to said dispensing outlet 8 by providing one connecting coupling 11 alone which connects said air supply conduit 9 with said beverage dispensing conduit 5, thus avoiding further couplings to further conduits.

According to one advantageous embodiment, said beverage dispensing conduit 5 comprises a Venturi segment 12 between said tap 4 and said outlet 8.

By flowing through the Venturi segment 12, the fluid passage 6 reduces the cross section 7 thereof and then increases the cross section 7 thereof in the manner of Venturi conduit.

According to one embodiment, said Venturi segment 12 has a portion having a minimum cross section 14 of the cross section of fluid passage 7 thereof.

According to one embodiment, said air supply conduit 9 is engaged in said beverage dispensing conduit 5, thus achieving a fluid connection between said two conduits, in said Venturi segment 12.

According to one embodiment, said assembly comprises an air passage regulating valve 13.

According to one embodiment, said regulating valve 13 is provided in said air supply conduit 9 for regulating the width of the air passage 10.

According to one embodiment, said air supply conduit is engaged in said beverage dispensing conduit 5 immediately after said minimum cross section 14 of said Venturi segment 12.

According to one embodiment, said assembly comprises a tank 15, for example a tank for containing said beverage, e.g. cold coffee.

According to one embodiment, said assembly comprises a refrigerating device 16.

According to one embodiment, said refrigerating device 16 comprises a temperature adjustment device 40. According to one embodiment, said temperature adjustment device 40 is connected to an adjustment device or a control device or a control unit 35, advantageously but not necessarily of the controlled type, or controller 36, and/or with a feedback from a temperature sensor.

According to one embodiment, said tank is arranged in said, or is connected to said, refrigerating device 16 for cooling beverage 2 located in said tank.

According to one embodiment, said assembly comprises a thrust device or pump 17.

According to one embodiment, said pump 17 is arranged downstream of tank 15 to draw said cold beverage 2.

According to one embodiment, said pump 17 comprises a pump inlet 19 and a pump outlet 20.

According to one embodiment, said assembly comprises a first segment of beverage supply conduit 18.

According to one embodiment, said first segment of beverage supply conduit 18 connects said tank 15 to said pump inlet 19.

According to one embodiment, said tap 4 is arranged downstream of said pump 17.

According to one embodiment, said assembly comprises a second segment of beverage supply conduit 21.

According to one embodiment, said second segment of beverage supply conduit 21 connects said pump outlet 20 with said tap 4.

According to one embodiment, said second segment of beverage supply conduit 21 connects said pump outlet 20 with said tap 4, thus avoiding all couplings of other conduit for supplying gas.

According to one embodiment, said first segment of beverage supply conduit 18 connects said tank 15 to said pump inlet 19, thus avoiding all couplings of other conduit for supplying gas.

According to one embodiment, said refrigerating device 16 regulates the temperature of said cold beverage 2 in a controlled manner.

According to one embodiment, said air passage regulating valve 13 partializes the air supply conduit 9 by continuously regulating the entity of air inlet into said Venturi segment 12.

According to one embodiment, said air passage regulating valve 13 comprises a valve seat 23 arranged in a segment of said air supply conduit 9. Said air passage regulating valve 13 comprises a shutter 22 which is received in an adjustable manner in said valve seat 23, thus selectively occluding said air passage 10 in an adjustable manner.

According to one embodiment, said shutter 22 is screwed in an adjustable manner in said valve seat 23 and protrudes of said valve seat 23 with a shutter adjustment knob 24 which is accessible externally to said assembly 1 to regulate the position of said shutter 22.

According to one embodiment, said shutter adjustment knob 24 comprises a follower 25 inserted in a cavity 34 provided in the body of the beverage dispensing conduit 5, which is closed in the longitudinal extension thereof to limit the regulating travel of said shutter adjustment knob 24, for example from a minimum in which shutter 22 occludes said air passage 10, to a maximum in which it completely opens said air passage 10.

According to one embodiment, said shutter 22 is an electric or electronic valve for regulating the air flow 39.

According to one embodiment, said electric or electronic valve for regulating the air flow 39 is connected to a control unit 35 and/or a controller 36.

According to one embodiment, said air passage regulating valve 13 comprises a sleeve valve 45, which for example but not necessarily, surrounds the body of the beverage dispensing conduit 5 outside said Venturi segment 12, and in particular where the air supply conduit 9 defining said air passage 10 is present.

According to one embodiment, said body of the beverage dispensing conduit 5 externally has a seat in which said sleeve valve 45 may slide to overlap and thus occlude said air passage 10.

According to one embodiment, said sleeve valve 45 cooperates with gaskets, for example O-ring gaskets 46 inserted into body seats of the beverage dispensing conduit 5, for example around the suction mouth of said air supply conduit 9, or slightly above and slightly below and positioned circumferentially, to close the access of air in said air passage 10.

According to one embodiment, said assembly 1 comprises a nebulizer 26.

Said nebulizer 26 is arranged in said beverage dispensing conduit 5 downstream of said Venturi segment 12 and said connecting coupling of the air supply conduit 11.

According to one embodiment, said nebulizer 26 comprises a nebulizer body 27 arranged floating in a nebulization segment 28 of said beverage dispensing conduit 5, thus forming a seat for said nebulizer 26.

According to one embodiment, said nebulizer 26 forces the fluid of the cold beverage 2 combined with the air, to flow about said nebulizer body 27 to uniform air bubbles 29 in said fluid.

According to one embodiment, said tank 15 is an open tank or an unpressurized tank.

According to one embodiment, said tank 15 is a pressurized tank 41 and said beverage supply conduit 3 is connected to said tap 4, thus avoiding the presence of a pump 17.

According to one embodiment, said tank 15 or 41 contains concentrated coffee or a concentrated beverage 42. According to one embodiment, said beverage supply conduit 3 includes a coupling with a liquid supply conduit 43 adapted to dilute the concentrated coffee.

According to one embodiment, said liquid supply conduit 43 is selectively regulated in the flow of liquid by means of a liquid flow regulating valve 44 provided in said liquid supply conduit 43.

According to one embodiment, a pressure switch 30 operatively connected to said pump 17 is between said tank 15 and said pump 17, or downstream of said pump 17.

According to one embodiment, said pressure switch 30 is regulated so as to detect the opening of tap which generates a lowering of the pressure in the beverage supply conduit 3, thus actuating said pump 17.

According to one embodiment, a shutdown pressure switch 37 operatively connected to said pump 17 is between said tank 15 and said pump 17, or downstream of said pump 17.

According to one embodiment, said pressure switch 37 is regulated so as to detect the lack of fluid in the beverage supply conduit 3, for example due to the emptying of the tank 15, thus causing the shutdown of said pump 17. According to one embodiment, a button for restarting the pump is included when the tank is replenished or replaced with one containing the beverage.

According to one embodiment, said tap 4 is a faucet provided with a control lever 31 which opens or closes a tap shutter 32 which opens or closes said beverage supply conduit 3 by putting it into fluid communication with said beverage dispensing conduit 5.

According to one embodiment, said tap 4 is an electric or electronic tap 38 which, for example, opens or closes the fluid passage by means of a solenoid valve.

According to one embodiment, said tap 4 is an electric or electronic tap 38 which is connected to a control unit 35 and/or a controller 36.

According to one embodiment, it is avoided to provide, between said tank 15 and said dispensing outlet 8, any device for injecting any gas into the beverage supply conduit 3.

A possible method for dispensing a beverage is described below.

A method for dispensing a beverage, e.g. cold beverage, comprising the steps of:
sending a cold beverage 2 from a tank 15 to a tap 4;
accelerating the flow of the cold beverage 2 downstream of tap 4 by means of a Venturi segment 12;
injecting air at ambient pressure into said Venturi segment 12 using only the depression formed by said Venturi segment 12;
dispensing said cold beverage 2 mixed with air from a dispensing outlet 8.

According to a further dispensing method, there are provided further optional steps of:
storing the cold beverage 2 in the tank while regulating the temperature of the cold beverage 2 in a controlled manner;
or, or with also
forming a foam 33 in said Venturi segment 12 with the injection of air
or, or with also
following said injection into said Venturi segment 12, nebulizing said foam 33;
or, or with also
avoiding to inject any other gas into the cold beverage 2 which is not air taken at ambient pressure, along the whole path of the beverage from the tank 15 to the dispensing outlet 8.

A person skilled in the art may make many changes, adaptations and replacements to the embodiments described herein or can replace elements with others which are functionally equivalent in order to satisfy contingent needs without however departing from the scope of protection as described and claimed herein.

According to one embodiment, said Venturi segment 12 is arranged downstream of all beverage pressurizing devices 17.

According to one embodiment, said Venturi segment 12 is arranged downstream of all mixing couplings of any fluid, other than air, provided in said beverage supply conduit 3 or provided in said beverage dispensing conduit (5).

According to one embodiment, said tank 15 is a bag-in box 47.

According to one embodiment, said tank 15 is arranged in a cold chamber or refrigerating device 16.

According to one embodiment, said dispensing assembly 1 comprises an instantaneous refrigerating device 48 arranged along said beverage supply conduit 3.

According to one embodiment said dispensing assembly 1 of a cold beverage 2 comprises a fluid energizing device 17, 49, or fluid pressurizing device, and in which said fluid energizing device 17, 49 is arranged upstream of said Venturi segment 12 with respect to said dispensing outlet 8.

According to one embodiment, said fluid energizing device 17, 49 is a pump 17 for drawing the fluid from a tank 15, or a pump 17 for pressurizing said fluid, and is arranged upstream of a tank 15, or a device 49 for injecting pressurized gas, e.g. nitrogen $N_2$, into said tank 15.

According to one embodiment, said fluid energizing device 17, 49 causes a flow rate between 10 ml/sec and 20 ml/sec, preferably 14 ml/sec, and a pressure between 1.4 bar and 4.1 bar, preferably of 2.7 bar, thus allowing a prevalence which activates said Venturi segment 12.

According to one embodiment, said tap 4 is an electrically-actuated automatic shut-off valve, for example a solenoid valve or an electric or electronic tap 38 and the air passage regulating valve 13 is made as an electric or electronic air flow regulating valve 39, both operatively connected and controlled by a control unit 35 and a controller 36.

LIST OF REFERENCES 1 dispensing assembly
2 cold beverage 3 beverage supply conduit
4 opening and closing tap
5 beverage dispensing conduit
6 fluid passage
7 cross section of fluid passage
8 dispensing outlet
9 air supply conduit
10 air passage
11 connecting coupling of the air supply conduit
12 Venturi segment
13 air passage regulating valve
14 minimum cross section
15 tank
16 refrigerating device
17 pump
18 first segment of beverage supply conduit
19 pump inlet
20 pump outlet
21 second segment of beverage supply conduit
22 shutter
23 valve seat
24 shutter adjustment knob
25 follower
26 nebulizer
27 nebulizer body
28 nebulization segment
29 air bubbles
30 pressure switch
31 control lever
32 tap shutter
33 foam
34 follower cavity
35 control unit
36 controller
37 pump shutdown pressure switch
38 electric or electronic tap
39 electric- or electronic-type air flow regulating valve
40 temperature adjustment device
41 pressurized tank
42 concentrated cold coffee or concentrated beverage
43 liquid supply conduit for diluting concentrated coffee or concentrated beverage
44 regulating valve of flow liquid for diluting concentrated coffee or concentrated beverage
45 sleeve valve
46 O-ring gaskets
47 bag-in box
48 instantaneous refrigerating device
49 pressurized gas injecting device

The invention claimed is:

1. A dispensing assembly for a cold beverage, comprising:
a beverage supply conduit;
an opening and closing tap for closing or opening the beverage supply conduit;
a beverage dispensing conduit, said beverage dispensing conduit delimiting a fluid passage, said fluid passage having a cross section of fluid passage transverse to the longitudinal extension thereof;
when open, said opening and closing tap fluidly connecting said beverage supply conduit to said beverage dispensing conduit;
a dispensing outlet opening or dispensing outlet;
said dispensing outlet being arranged at the end of said beverage dispensing conduit;
an air supply conduit, said air supply conduit delimiting an air passage;
said air supply conduit leading, on one side, directly outside the dispensing assembly, thus avoiding interposition of return devices or air supply pumps, and said air supply conduit leading, on an opposite side, into said beverage dispensing conduit;
said opening and closing tap being directly connected to said dispensing outlet by providing a connecting coupling which connects said air supply conduit to said beverage dispensing conduit;
wherein
said beverage dispensing conduit comprises a Venturi segment between said tap and said dispensing outlet wherein, by flowing through the Venturi segment, the fluid passage reduces the cross section of fluid passage thereof and then increases the cross section of fluid passage thereof as in a Venturi conduit;
said air supply conduit is engaged in said beverage dispensing conduit in said Venturi segment;
said Venturi segment is arranged downstream of all beverage pressurizing devices, considering flow of the beverage; and
said Venturi segment is arranged downstream of all mixing couplings of any fluid, other than air supplied in said Venturi segment, provided in said beverage supply conduit or in said beverage dispensing conduit.

2. The dispensing assembly of claim 1, wherein are provided one or more of the following alternatives:
said assembly comprises an air passage regulating valve;
said air passage regulating valve is provided in said air supply conduit for regulating a magnitude of the air passage;
or wherein
said Venturi segment has a portion having a minimum cross section of the cross section of fluid passage thereof;
said air supply conduit is joined in said beverage dispensing conduit in or immediately after said minimum cross section of said Venturi segment;
or wherein
said opening and closing tap is directly connected to said dispensing outlet by providing a connecting coupling which connects said air supply conduit to said beverage dispensing conduit, thus avoiding further couplings to further conduits.

3. The dispensing assembly of claim 1, wherein are provided one or more of the following alternatives:
said dispensing assembly comprises a tank;
wherein
said tank is a bag-in box;
or wherein
said dispensing assembly comprises a refrigerating device; and
said tank is arranged in, or connected to said refrigerating device for cooling the beverage located in said tank;
or wherein
said tank is disposed inside a cold chamber or refrigerating device;
or wherein
said dispensing assembly comprises an instantaneous refrigerating device arranged along said beverage supply conduit;
or wherein
said dispensing assembly comprises a fluid energizing device or fluid pressurizing device arranged upstream of said Venturi segment with respect to said dispensing outlet;

or wherein
said fluid energizing device is a pump for drawing fluid from a tank, or for pressurizing said fluid, and is arranged upstream of a tank, or a device for injecting pressurized gas into said tank;
said fluid energizing device causes a flow rate between 10 ml/sec and 20 ml/sec, and a pressure between 1.4 bar and 4.1 bar, allowing a prevalence which activates said Venturi segment;
or wherein
said dispensing assembly comprises a thrust device or pump arranged downstream of the tank to draw said cold beverage; said pump comprising a pump inlet and a pump outlet;
said dispensing assembly comprises a first segment of beverage supply conduit; said first segment of beverage supply conduit connecting said tank to said pump inlet;
said opening and closing tap is arranged downstream of said pump;
said dispensing assembly comprises a second segment of beverage supply conduit,
said second segment of beverage supply conduit connecting said pump outlet to said opening and closing tap or wherein
said second segment of beverage supply conduit connects said pump outlet to said opening and closing tap, avoiding any couplings of other conduit for supplying gas;
or wherein
said first segment of beverage supply conduit connects said tank to said pump inlet, avoiding any couplings of other conduit for supplying gas;
and/or wherein
said refrigerating device regulates the temperature of said cold beverage in a controlled manner.

4. The dispensing assembly of claim 2, wherein said air passage regulating valve partializes the air supply conduit by continuously regulating air incoming into said Venturi segment.

5. The dispensing assembly of claim 2, wherein are provided one or more of the following alternatives:
said air passage regulating valve comprises a valve seat arranged in a segment of said air supply conduit said air passage regulating valve comprises a shutter received in an adjustable manner in said valve seat, thus selectively occluding said air passage in an adjustable manner;
or wherein
said shutter is screwed in an adjustable manner in said valve seat and protrudes from said valve seat with a shutter adjustment knob accessible externally to said dispensing assembly to regulate the position of said shutter;
or wherein
said shutter adjustment knob comprises a follower inserted in a cavity provided in the beverage dispensing conduit to limit rotation of said shutter adjustment knob from a minimum in which the shutter occludes said air passage, to a maximum in which the shutter completely opens said air passage.

6. The dispensing assembly of claim 1, wherein are provided one or more of the following alternatives:
said assembly comprises a nebulizer;
said nebulizer is arranged in said beverage dispensing conduit downstream of said Venturi segment and said connecting coupling;
or wherein
said nebulizer comprises a nebulizer body arranged floating in a nebulization segment of said beverage dispensing conduit, thus forming a seat for said nebulizer;
or wherein
said nebulizer forces the fluid of the cold beverage combined with air, to flow around said nebulizer body to uniform air bubbles in said fluid.

7. The dispensing assembly of claim 3, wherein are provided one or more of the following alternatives:
said tank is an open tank or an unpressurized tank;
or wherein
said tank is a pressurized tank and said beverage supply conduit is connected to said opening and closing tap, thus avoiding including a pump;
or wherein
said tank contains concentrated coffee or a concentrated beverage;
or wherein
said beverage supply conduit includes a coupling with a liquid supply conduit suitable for diluting the concentrated coffee;
or wherein
said liquid supply conduit is selectively regulated in the liquid flow by a liquid flow regulating valve provided in said liquid supply conduit;
or wherein
a pressure switch operatively connected to said pump is arranged between said tank and said pump;
or wherein
said pressure switch is regulated to detect opening of the opening and closing tap which generates a pressure lowering in the beverage supply conduit, thus actuating said pump;
or wherein
said opening and closing tap is a faucet provided with a control lever which opens or closes a tap shutter which opens or closes said beverage supply conduit by putting it into fluid communication with said beverage dispensing conduit.

8. The dispensing assembly of claim 1, wherein it is avoided to place, between said tank and said dispensing outlet, any device for injecting any gas into the beverage supply conduit.

* * * * *